United States Patent
Jogan

(10) Patent No.: US 11,454,641 B2
(45) Date of Patent: Sep. 27, 2022

(54) SENSOR CAP NUT AND SENSOR CAP

(71) Applicant: NAKANISHI METAL WORKS CO., LTD., Osaka (JP)

(72) Inventor: Yutaka Jogan, Osaka (JP)

(73) Assignee: NAKANISHI METAL WORKS CO., LTD., Osaka (JP)

(*) Notice: Subject to any disclaimer, the term of this patent is extended or adjusted under 35 U.S.C. 154(b) by 3 days.

(21) Appl. No.: 17/201,718

(22) Filed: Mar. 15, 2021

(65) Prior Publication Data
US 2021/0302460 A1 Sep. 30, 2021

(30) Foreign Application Priority Data
Mar. 27, 2020 (JP) .............. JP2020-057166

(51) Int. Cl.
*G01R 33/00* (2006.01)
*G01P 3/44* (2006.01)
*G01P 1/02* (2006.01)

(52) U.S. Cl.
CPC .............. *G01P 3/443* (2013.01); *G01P 1/026* (2013.01)

(58) Field of Classification Search
CPC .. G01P 1/023; G01P 1/026; G01P 3/44; G01P 3/443; G01P 3/446; G01P 3/487; B60B 27/0068; B60B 27/0073; F16C 19/184; F16C 19/186; F16C 19/52; F16C 43/045; F16C 41/007; F16C 33/723; F16C 2326/02; F16C 2204/50; F16C 2204/52; F16C 2233/00
See application file for complete search history.

(56) References Cited

U.S. PATENT DOCUMENTS

| | | | |
|---|---|---|---|
| 2016/0244040 A1* | 8/2016 | Kamui | F16C 33/723 |
| 2017/0256105 A1* | 9/2017 | Lopes | B60B 27/065 |
| 2018/0003238 A1* | 1/2018 | Takayama | F16C 33/723 |
| 2018/0009093 A1* | 1/2018 | Jung | B25B 27/0035 |
| 2019/0293122 A1* | 9/2019 | Nakamura | F16C 19/186 |

FOREIGN PATENT DOCUMENTS

| | | |
|---|---|---|
| JP | 2006009889 A | 1/2006 |
| JP | 4576992 B2 | 11/2010 |
| JP | 2018071775 A | 5/2018 |

* cited by examiner

*Primary Examiner* — Thang X Le
(74) *Attorney, Agent, or Firm* — Innovation Capital Law Group, LLP; Vic Lin

(57) ABSTRACT

A nut is used with being fixed to a sensor cap. The sensor cap is attached to an outer ring of a bearing in a wheel bearing device of an automobile. The sensor cap includes a sensor holder for holding a magnetic sensor. The nut is made of steel, and has a screw portion in which a bolt is screwed to attach the magnetic sensor to the sensor cap. A surface of the nut is coated with a zinc-nickel alloy plating layer with a nickel eutectic ratio of 8 to 18%.

4 Claims, 5 Drawing Sheets

SENSOR CAP NUT AND SENSOR CAP

TECHNICAL FIELD

The present invention relates to a nut used in a sensor cap that is attached to an outer ring of a bearing in a wheel bearing device.

BACKGROUND ART

There have been wheel bearing devices each provided with a rotation speed detector in a rolling bearing (hub bearing) for supporting an automobile wheel. In such wheel bearing devices, a magnetic encoder in which N poles and S poles are alternately arranged in a circumferential direction at a regular interval is attached to an inner ring in one end of the bearing in an axial direction, and a magnetic sensor for detecting rotation speed of the magnetic encoder is attached to a side of the bearing, which is close to an outer ring, to face the magnetic poles of the magnetic encoder (see Patent Literatures 1 to 3, for example).

In the inventions of Patent Literatures 1 to 3, a sensor cap having a sensor holder for holding the magnetic sensor is attached to the outer ring in the one end of the bearing in the axial direction. A nut is buried in or attached to a synthetic resin body of the sensor cap so as to be fixed to the body, and a female screw of the nut is used to fix the magnetic sensor to the sensor cap.

As the nut, a nut 23 that is a cat nut having a bag-like entire shape is used in Patent Literature 1, and an insert nut 1 and a nut 20 which have a through hole are used in Patent Literature 2 and 3.

CITATION LIST

Patent Literature

Patent Literature 1: JP 2006-009889 A
Patent Literature 2: JP 2018-071775 A
Patent Literature 3: Japanese Patent No. 4576992

SUMMARY OF INVENTION

Technical Problem

The nut is fixed to the sensor cap that is one of automobile chassis parts, and a bolt for fixing the magnetic sensor to the nut is screwed in a state where one end face of the nut and a screw hole are exposed to the exterior. Accordingly, the nut is required to have an anticorrosion property.

According to Patent Literature 2, it is desirable that brass is selected for a material of the nut for providing the anticorrosion property to the nut, and that plating is applied to the nut in a case where the nut is made of an iron material (paragraph 0030 in Patent Literature 2).

According to Patent Literature 3, the nut is coated with a zinc plating layer through a galvanizing treatment (electrogalvanizing treatment) for allowing the nut to have the anticorrosion property (paragraph 0016 in Patent Literature 3).

Wheels and its periphery in an automobile are exposed to salt water containing a snow melting agent (calcium chloride). In view of this, the wheels and its periphery are required to have high anticorrosion property. In Patent Literatures 2 and 3, although there are disclosures regarding the plating as in the aforementioned disclosures, no detail is disclosed regarding the plating. In other words, a plating layer provided on the nut of a sensor cap is not optimized in prior arts. For example, even if a zinc plating layer is provided on a steel nut through the galvanizing treatment for rustproof, adequate rustproof may not be exhibited.

Regarding a brass nut, the base material of which is expensive and the strength of which is smaller than that of the steel nut. In free cutting brass according to JIS H 3250 (C3601, C3602, C3603, and C3604) among the brass that is an alloy of copper and zinc and contains the zinc in an amount of 20 wt % or more, lead is added in an amount of 1.8-3.7 wt % for enhancing the machinability.

Copper alloy containing lead in an amount of 0.1 wt % or more currently corresponds to an exempted item according to restriction of hazardous substances (RoHS) directive, which is the restriction in use of certain chemical substances in electrical and electronic equipment, and the use of such copper alloy will be prohibited on and after Jul. 21, 2021. Since the free-cutting brass according to JIS H 3250 (C3601, C3602, C3603, C3604) contains lead in an amount of 0.1 wt % or more, such brass will not be able to satisfy the RoHS directive and may not be able to be exported to European Union (EU) on and after Jul. 21, 2021.

An object of the present invention is to provide, regarding nuts that are used for a sensor cap and are required to have high anticorrosion property, a nut that satisfies the RoHS directive on and after Jul. 21, 2021 while preventing a manufacturing cost thereof from increasing and obtaining adequate anticorrosion property.

Solution to Problem

The substance of the present invention is as follows.

(1) A sensor cap nut is a nut used with being fixed to a sensor cap. The sensor cap is attached to an outer ring of a bearing in a wheel bearing device of an automobile, and has a sensor holder for holding a magnetic sensor. The nut that is made of steel; has a screw portion in which a bolt is screwed to attach the magnetic sensor to the sensor cap; and has a surface on which a zinc-nickel alloy plating layer with a nickel eutectic ratio of 8 to 10% is formed.

(2) In the sensor cap nut according to the above (1), the nickel eutectic ratio of the zinc-nickel alloy plating layer is 12 to 18%.

(3) A sensor cap includes the sensor cap nut according to the above (1) or (2).

Advantageous Effects of Invention

According to the aforementioned sensor cap nut and sensor cap of the present invention, the sensor cap nut is made of steel. The surface of the nut is coated with the zinc-nickel alloy plating layer with the nickel eutectic ratio of 8 to 18%.

Expensive brass is not used, so that a manufacturing cost can be reduced. Lead is not contained, so that the requirements of the RoHS directive can be satisfied on and after Jul. 21, 2021. Thus, the nut can be exported to European Union (EU) on and after Jul. 21, 2021. The steel is greater in strength than the brass, so that the strength in attachment of the magnetic sensor can be improved. The nut made of steel is coated with the zinc-nickel alloy plating layer, so that high anticorrosion property can be provided. Furthermore, the zinc-nickel alloy plating layer is a coating film containing nickel. Therefore, the coating film has high hardness, so as to be excellent in abrasion resistance against the bolt for attaching the magnetic sensor.

DESCRIPTION OF EMBODIMENTS

An aspect of the present invention is described in detail, based on an embodiment shown in the accompanying drawings. A direction along a rotation axis A of a wheel bearing device 20 shown in FIG. 5 refers to an "axial direction," and a direction orthogonal to the axial direction refers to a "radial direction".

Figure 5:
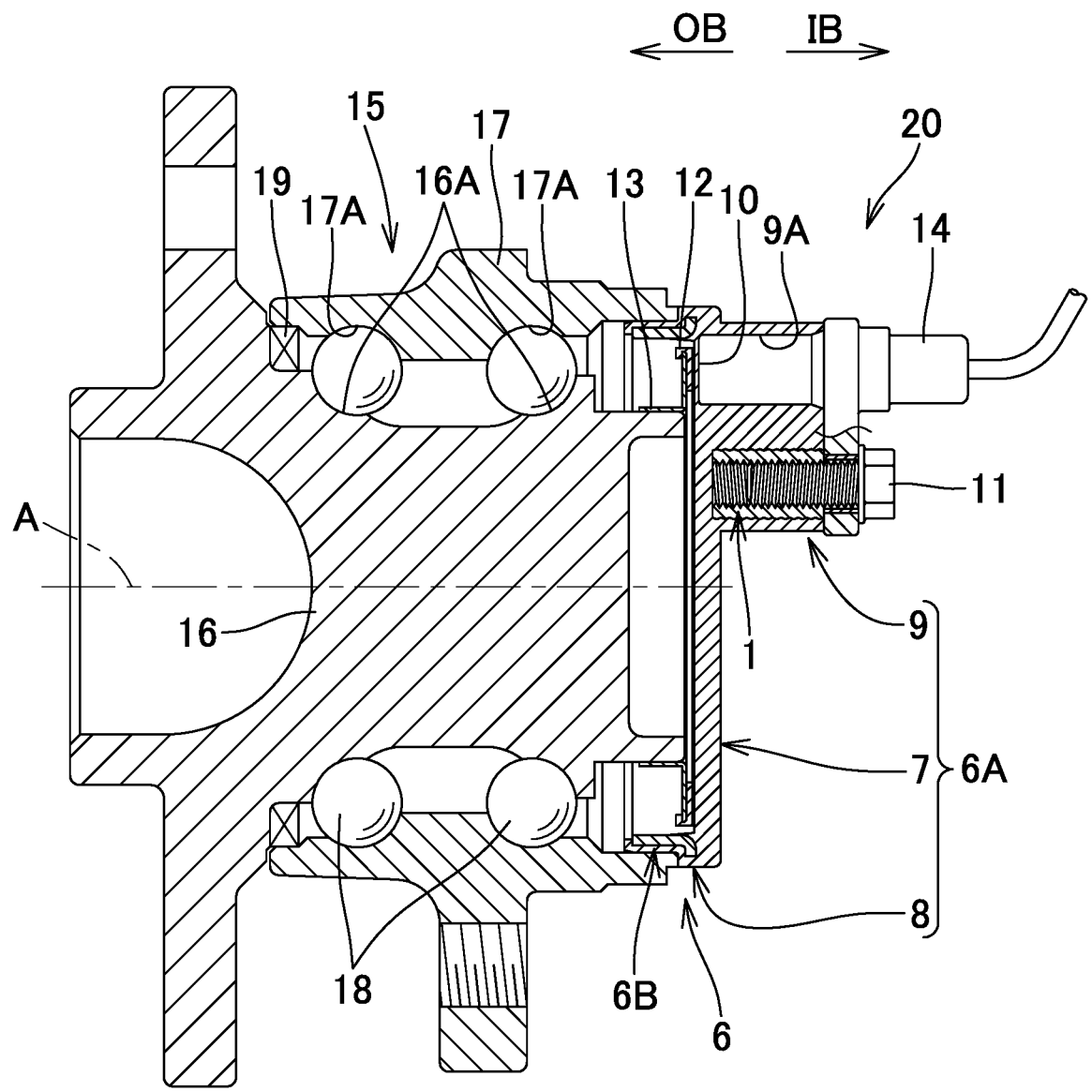
FIG. 5 is a vertical cross-sectional view of a wheel bearing device.

In a state where a sensor cap 6 is attached to a bearing 15, a direction (outboard) parallel to the axial direction directed from a body to wheels in an automobile refers to "outward" (see an arrow OB in FIG. 5), and a direction (inboard) parallel to the axial direction directed from the wheels to the body in the automobile refers to "inward" (see an arrow IB in FIG. 5).

<Sensor Cap Nut>

Figure 1A:
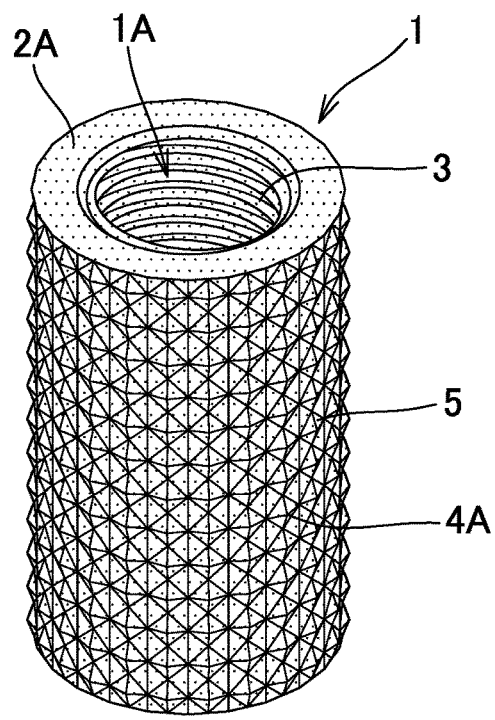
FIG. 1A is a perspective view of a sensor cap nut according to an embodiment of the present invention.
Figure 1B:
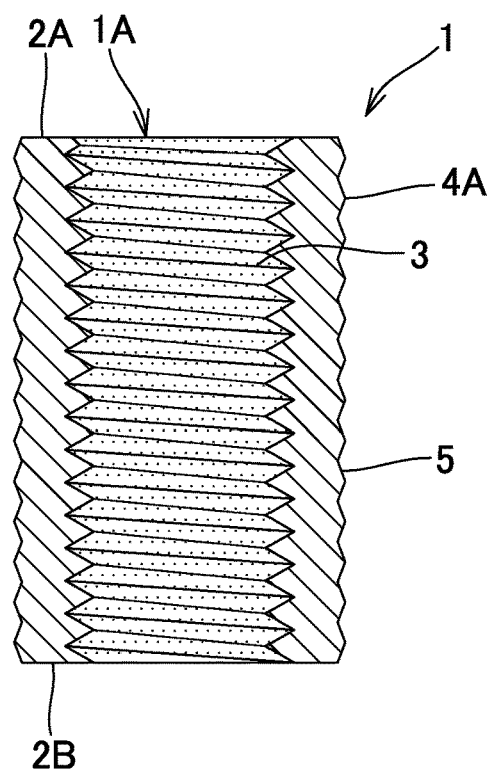
FIG. 1B is a vertical cross-sectional view of the sensor cap nut.

A sensor cap nut 1 according to the embodiment of the present invention shown in the perspective view of FIG. 1A and the vertical cross-sectional view of FIG. 1B has a substantially cylindrical shape, is made of steel, such as carbon steel wire for cold heading (SWCH material according to JIS G 3507-2), and is provided with a through hole 1A and a screw portion 3. Knurl portions 4A serving as twill lines are, for example, formed on an outer peripheral surface of the nut 1. The knurl portions 4A are formed by, for example, rotating the nut 1 with a lathe or the like and pressing a knurling tool against the nut. Thus, concave portions and convex portions are formed on the outer peripheral surface of the nut 1. The outer peripheral surface of the nut 1 is entirely coated with a zinc-nickel alloy plating layer 5.

Thickness of the zinc-nickel alloy plating layer 5 is 5 to 15 μm. If the thickness is less than 5 μm, an anticorrosive effect is poor for the sensor cap that is one of the automobile chassis components. If the thickness is above 15 μm, a gap becomes narrow to increase fastening force that is applied to a screw.

A nickel eutectic ratio of the zinc-nickel alloy plating layer 5 is preferably in the range of 8 to 18%, and more preferably 12 to 18%. If the nickel eutectic ratio is less than 8%, the anticorrosive effect is poor for the sensor cap that is one of the automobile chassis components. If the nickel eutectic ratio is above 18%, the zinc-nickel alloy plating layer 5 has excessive quality, which increases a cost.

<Sensor Cap>

Figure 2A:
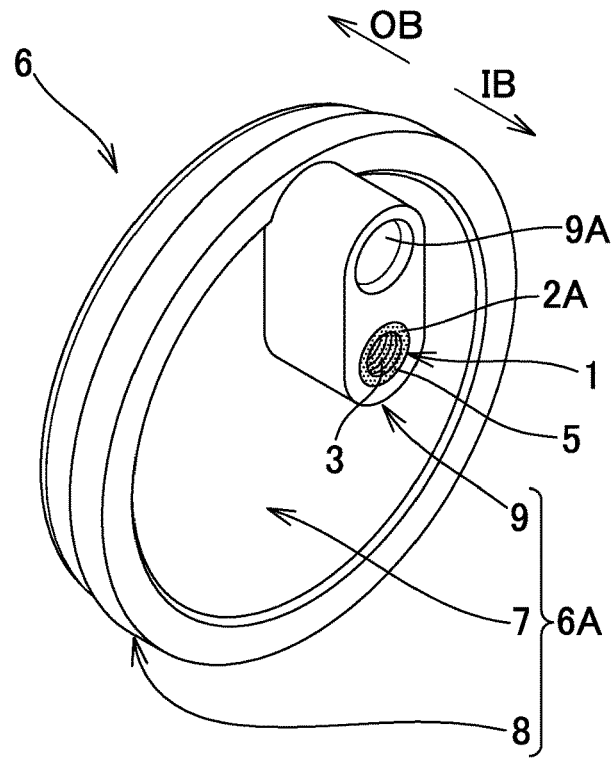
FIG. 2A is a perspective view of a sensor cap in which the nut is buried, viewed from an inward side of the sensor cap.
Figure 2B:
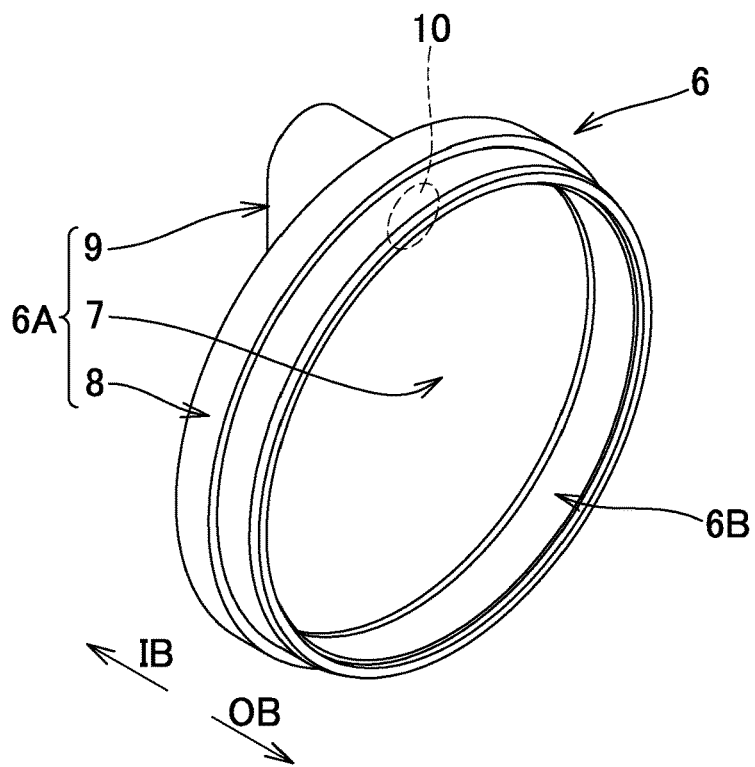
FIG. 2B is a perspective view of the sensor cap in which the nut is buried, viewed from an outward side of the sensor cap.
Figure 3:
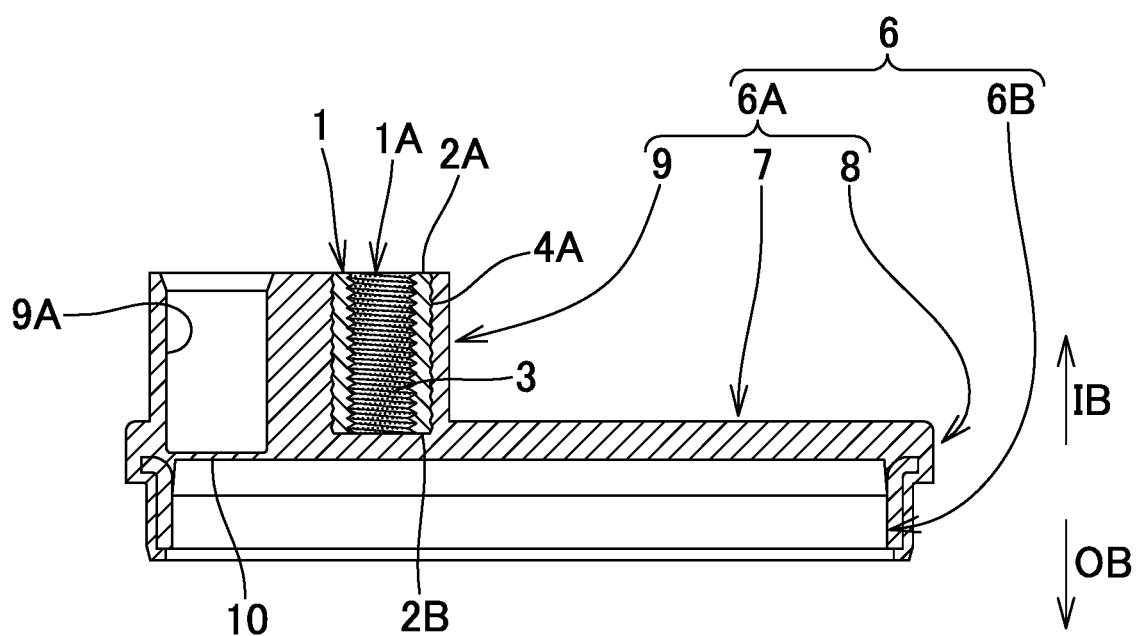
FIG. 3 is a vertical cross-sectional view of the sensor cap.

As shown in the perspective views of FIGS. 2A and 2B and the vertical cross-sectional view of FIG. 3, the sensor cap 6 in which the sensor cap nut 1 is buried includes a fiber-reinforced synthetic resin body 6A and a metallic annular body 6B.

Here, the fiber-reinforced synthetic resin for forming the body 6A is a synthetic resin, in which 20 to 70 weight % of glass fiber is contained. The synthetic resin includes polyamide (nylon 6, nylon 66, or the like), polyphenylene sulfide (PPS), or polybutylene terephthalate (PBT), for example.

It is preferable for the metallic annular body 6B to use a cold-rolled steel plate, such as steel plate cold commercial (SPCC) made of low carbon steel.

The body 6A includes a disc part 7 and a cylindrical part 8 which form a cup shape, and a sensor holder 9 projecting inward (see the arrow IB) from the disc part 7.

The disc part 7 includes a separation wall 10 that is thinner than the other area of the disc part 7 and that separates a magnetic encoder 12 from a magnetic sensor 14 (FIG. 5).

The sensor holder 9 holds the nut 1 in which a bolt 11 (FIG. 5) for attaching the magnetic sensor 14 to the sensor holder 9 (FIG. 5) is screwed, and is provided with a sensor attachment hole 9A in which the magnetic sensor 14 is inserted.

The nut 1 and the metallic annular body 6B are insert articles, and are each united with the fiber-reinforced synthetic resin body 6A by injection molding. As shown in the vertical cross-sectional view of FIG. 3, the synthetic resin enters the knurl portions 4A of the nut 1. Accordingly, the nut 1 buried in the sensor holder 9 is locked and fixed thereto. The cylindrical part 8 wraps around an outward (see the arrow OB) end periphery of the metallic annular body 6B, so that the metallic annular body 6B and the fiber-reinforced synthetic resin body 6A are mechanically coupled.

Figure 4A:
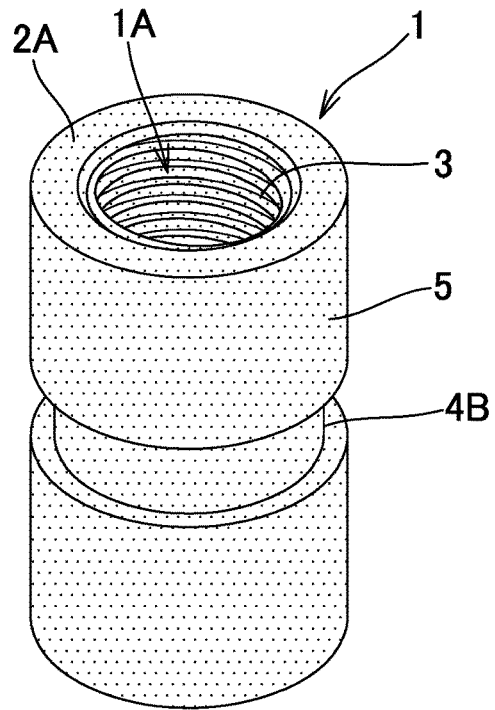
FIG. 4A is a perspective view of a modification of the sensor cap nut.
Figure 4B:
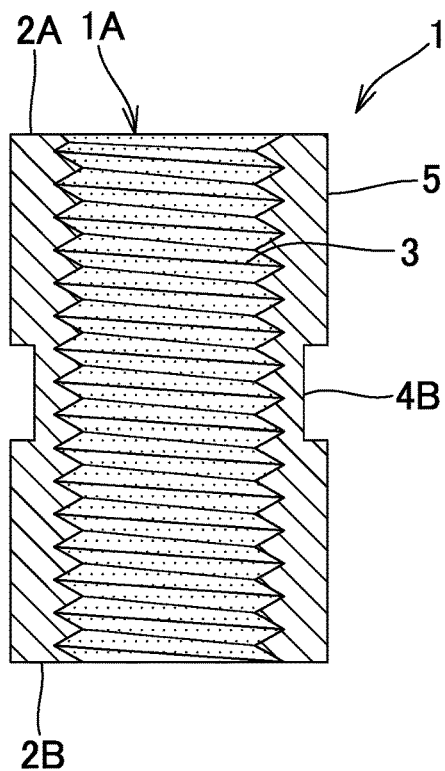
FIG. 4B is a vertical cross-sectional view of the sensor cap nut.

The locking of the nut 1 is not limited to the knurl portions 4A provided on the outer peripheral surface of the nut 1, but may be a circumferential groove 4B provided on the outer peripheral surface of the nut 1 as shown in the perspective view of FIG. 4A and the vertical cross-sectional view of FIG. 4B, or a flange portion, which is not shown, provided on the nut 1. A plurality of such locking ways may be combined.

As shown in the perspective view of FIG. 2A and the vertical cross-sectional view of FIG. 3, in the nut 1, one end portion 2A of opposite end portions 2A and 2B (FIG. 1B) in a direction parallel to the axial direction A (FIG. 5) and a screw portion 3 are exposed in a state where the nut 1 is buried in the sensor holder 9 of the sensor cap 6.

<Wheel Bearing Device in Automobile>

As shown in the vertical cross-sectional view of FIG. 5, the wheel bearing device 20 includes, in addition to the bearing 15 in which an inner ring 16 rotates relative to an outer ring 17, the magnetic encoder 12, the sensor cap 6, the magnetic sensor 14, a seal member 19 provided on the outward (see the arrow OB) end periphery of the bearing 15, and the like.

The bearing 15 includes: the inner ring 16 having, on the outer peripheral surface thereof, an inner ring trace surface 16A; the outer ring 17 having, on the inner peripheral surface, an outer ring trace surface 17A; rolling elements 18 rolling between the inner ring trace surface 16A and the outer ring trace surface 17A.

The magnetic encoder 12 has N and S poles alternately arranged at a regular interval in the circumferential direction, and is fixed to the inner ring 16 by a support member 13 positioned inward (see the arrow IB) end periphery of the bearing 15.

The sensor cap 6 has a cup shape and is attached to the outer ring 17 so as to seal the inward end periphery of the bearing 15, and has the sensor holder 9 for holding the magnetic sensor 14.

The magnetic sensor 14 attached to the sensor holder 9 of the sensor cap 6 faces the magnetic encoder 12 across the separation wall 10, and detects the rotation speed of the magnetic encoder 12.

The sensor cap 6 has the separation wall 10, so as not to be provided with a through hole penetrating the sensor cap 6 in the thickness direction thereof, thereby eliminating the necessity of incorporation of a seal member, such as an O-ring.

The sensor cap 6 seals the inward end periphery of the bearing 15, thereby preventing pebbles, muddy water, and the like from hitting the magnetic encoder 12. Therefore, breakage of the magnetic encoder 12 can be prevented.

Furthermore, the sensor cap 6 seals the inward end periphery of the bearing 15, thereby eliminating the necessity of the seal member in the inward side of the magnetic encoder 12. Therefore, sliding resistance is reduced to reduce rotation torque of the bearing 15.

The sensor cap 6 includes the sensor holder 9, so that complicated operations in adjusting an air gap between the magnetic encoder 12 and the magnetic sensor 14 can be eliminated.

The sensor cap 6 shown in an example of FIG. 5 is formed by injection molding, with the metallic annular body 6B and the nut 1 as insert articles. The nut 1 may be incorporated, not as an insert article, but through outsert molding. If the nut is attached through the outsert molding, a prepared hole is first molded, for example, at the injection molding being performed to mold the sensor cap 6 with the metallic annular body 6B as the insert article, and then the nut 1 is press-fitted in the prepared hole after the molding of the sensor cap 6. At this time, the nut 1 may be heated and press-fitted while resin of the sensor holder 9 is softened.

<Test for Evaluating Anticorrosion Property of Zinc-Nickel Alloy Plating Layer>

As described above, the sensor cap nut 1 is made of steel and its entire surface is coated with the zinc-nickel alloy plating layer 5. Experiments for evaluating anticorrosion property of the zinc-nickel alloy plating layer 5 were performed.

EXAMPLES AND COMPARATIVE EXAMPLES 20 nuts each having a cold-heading carbon steel that was not yet coated with the zinc-nickel alloy plating layer 5 so as to be exposed were prepared. On each surface of 10 nuts among the 20 nuts, the zinc-nickel alloy plating layer 5 (nickel eutectic ratio: 12 to 18%) having the thickness of 5 μm was formed, to prepare Examples. On each surface of the remaining 10 nuts, a zinc plating layer having the thickness of 5 μm was formed, to prepare Comparative Examples.

(Experiment Method)

To the prepared nuts of Examples and Comparative Examples, salt water (water temperature: 35° C.±3° C., the concentration of salt water: 5 wt %) is sprayed for 2000 consecutive hours.

(Evaluation Method)

(1) In experiments according to the aforementioned experiment method, the nuts in Examples and Comparative Examples are examined, to evaluate the generation of rust.

(2) White rust, which is an oxide appearing due to a sacrificial anticorrosive effect by galvanization, may be generated. Even if such white rust is generated, the white rust does not develop into an iron substrate. Accordingly, there is no problem regarding the anticorrosion property. On the other hand, if red rust that develops into the iron substrate is generated, there is a problem regarding the anticorrosion property.

<Evaluation Result>

(1) In the nuts of Comparative Examples, red rust was generated after about 600 hours passed.

(2) Regarding the nuts in Examples, in all of the ten nuts after the experiments according to the aforementioned experiment method, the white rust was generated in the end face and the side face of each nut but no red rust was generated.

(3) In the nuts of Examples, the red rust was not generated even under such strict conditions as in the aforementioned experiment method. This explains that the sensor cap nut 1, the surface of which is coated with the zinc-nickel alloy plating layer 5, has extremely high anticorrosion property.

Thickness of the zinc-nickel alloy plating layer 5 for coating the steel nut is preferably 5 μm or more, in view of the above experiments. Accordingly, the thickness may be 5 to 15 μm. If the nickel eutectic ratio of the zinc-nickel alloy plating layer 5 is made in the range of 12 to 18% in view of the above experiments, an extremely high antirust effect can be obtained. Here, the high antirust effect can also be obtained in the range of 8% or more. If the nickel eutectic ratio of the zinc-nickel alloy plating layer 5 exceeds 18%, the quality is excessive, which increases a cost.

After the steel nut is coated with the zinc-nickel alloy plating layer 5, trivalent chromium processing may be performed, and then non-chromium high corrosion resistance film processing or silica-based high antirust coating processing may further be performed, to thereby provide a protective film on a surface layer of the zinc-nickel alloy plating layer 5. This further enhances the anticorrosion property.

<Effect>

Since the sensor cap nut 1 made of steel and coated with the zinc-nickel alloy plating layer 5 is used, the expensive brass is not used. Accordingly, a manufacturing cost can be reduced. The sensor cap nut 1 does not contain lead, so that the requirements of the RoHS directive can be satisfied on and after Jul. 21, 2021. Therefore, the nut can be exported to European Union (EU) on and after Jul. 21, 2021. The steel is greater in strength than the brass, so that the strength in attachment of the magnetic sensor 14 can be improved. The nut 1 made of steel is coated with the zinc-nickel alloy plating layer 5, so that high anticorrosion property can be provided. Furthermore, the zinc-nickel alloy plating layer 5 is a coating film containing nickel. Accordingly, the coating film has high hardness, so as to be excellent in abrasion resistance against the bolt 11 for attaching the magnetic sensor 14.

In the above embodiments, the sensor cap nut 1 has the through hole 1A. The sensor cap nut 1 may serve as an insert nut in a cat nut type, the entire of which is formed in a bag shape.

The above description regarding the embodiment is all examples, and thus the present invention is not limited thereto. Various improvements and modifications without departing from the scope of the present invention can be applied.

REFERENCE SIGNS LIST

1 . . . Sensor cap nut
1A . . . Through hole 2A, 2B . . . End portion
3 . . . Screw portion
4A . . . Knurl portion
4B . . . Circumferential groove
5 . . . Zinc-nickel alloy plating layer
6 . . . Sensor cap
6A . . . Fiber-reinforced synthetic resin body
6B . . . Metallic annular body
7 . . . Disc part
8 . . . Cylindrical part
9 . . . Sensor holder
9A . . . Sensor attachment hole
10 . . . Separation wall
11 . . . Bolt
12 . . . Magnetic encoder
13 . . . Support member
14 . . . Magnetic sensor
15 . . . Bearing
16 . . . Inner ring
16A . . . Inner ring trace surface
17 . . . Outer ring
17A . . . Outer ring trace surface
18 . . . Rolling element
19 . . . Seal member
20 . . . Wheel bearing device
A . . . Axial direction
IB . . . Inward
OB . . . Outward

The invention claimed is:

1. A sensor cap nut that is a nut used with being fixed to a sensor cap, comprising:
    the sensor cap is attached to an outer ring of a bearing in a wheel bearing device of an automobile, and has a sensor holder for holding a magnetic sensor, and
    the sensor cap nut is made of steel, has a screw portion in which a bolt is screwed to attach the magnetic sensor to the sensor cap, and has a surface on which a zinc-nickel alloy plating layer with a nickel eutectic ratio of 8 to 10% is formed.

2. The sensor cap nut according to claim 1, wherein the nickel eutectic ratio of the zinc-nickel alloy plating layer is 12 to 18%.

3. A sensor cap comprising the sensor cap nut according to claim 1.

4. A sensor cap comprising the sensor cap nut according to claim 2.

* * * * *